United States Patent [19]
Schiller et al.

[11] Patent Number: 5,407,627
[45] Date of Patent: Apr. 18, 1995

[54] PROCESS AND APPARATUS FOR FORMING STRESS-FREE THERMOSETTING RESIN PRODUCTS

[75] Inventors: Paul R. Schiller; Jost H. Schiller, both of West Vancouver, Canada

[73] Assignee: Polycryl Enterprises Inc., British Columbia, Canada

[21] Appl. No.: 924,174

[22] Filed: Aug. 3, 1992

[51] Int. Cl.$^6$ .............................................. B29C 71/02
[52] U.S. Cl. .................................... 264/236; 264/313; 264/316; 264/338; 264/347; 264/331.18
[58] Field of Search ............... 264/236, 338, 313, 347, 264/316, 331.18

[56] References Cited

U.S. PATENT DOCUMENTS

| | | | |
|---|---|---|---|
| 2,369,593 | 2/1945 | Marks | 264/236 |
| 2,614,955 | 10/1952 | Halsall | 264/236 |
| 3,240,854 | 3/1966 | Ewer | 264/236 |
| 3,405,088 | 10/1968 | Slocum | 260/41 |
| 3,562,379 | 2/1971 | Duggins | 264/171 |
| 3,600,490 | 8/1971 | Billingsky | 264/236 |
| 4,473,673 | 9/1984 | Williams et al. | |
| 4,652,596 | 3/1987 | Williams et al. | |
| 4,681,712 | 7/1987 | Sakakibara et al. | |
| 4,816,492 | 3/1989 | Schiller et al. | |

FOREIGN PATENT DOCUMENTS

| | | |
|---|---|---|
| 0470584 | 2/1992 | European Pat. Off. |
| 2922675 | 1/1981 | Germany |
| 3712959 | 10/1988 | Germany |
| 56-011223 | 2/1981 | Japan |
| 57-163520 | 10/1982 | Japan |
| 59-055729 | 3/1984 | Japan |
| 63-246213 | 10/1988 | Japan |
| 2057336 | 4/1981 | United Kingdom |
| 2199282 | 7/1988 | United Kingdom |
| WO93/05941 | 4/1993 | WIPO |

Primary Examiner—James Derrington
Attorney, Agent, or Firm—Merchant, Gould, Smith, Edell, Welter & Schmidt

[57] ABSTRACT

This invention is directed to a novel method and apparatus for casting stress-free thermosetting resin materials. A process for forming a thermosetting product which comprises: (a) pouring a thermosetting polymer, with initiator, and catalyst, into a cavity of a mold which has a polymer coating or film on the interior surface thereof; (b) permitting the polymer to cure to a point where the cured material is reasonably dimensionally stable; (c) removing the partially cured polymeric material from the mold and placing the material in an oven; and (d) fully curing the polymeric material in the oven.

16 Claims, 2 Drawing Sheets

PROCESS AND APPARATUS FOR FORMING STRESS-FREE THERMOSETTING RESIN PRODUCTS

FIELD OF THE INVENTION

This invention is directed to a novel method and apparatus for casting stress-free thermosetting resin materials.

BACKGROUND OF THE INVENTION

Thermosetting polymer products of various types have been produced by various processes and apparatus ranging from free mold pouring of resin with fillers to double enclosed molds where the polymer material is heated in the mold and after polymerization, the mold is opened to produce a finished molded product.

Thermosetting resins in the form of kitchen sinks, vanity tops, counter tops, and the like, have been produced for many years using various types of molds and processes. Typically, the thermosetting polymer, such as a polyester, or a polyacrylate, is formed in a mold, and cured in the mold to produce the finished product. A problem with this technique is that the thermosetting resins tend to shrink as they cure. Moreover, during the shrinking process, while the curing reaction proceeds to completion, latent stresses are created in the finished product. These latent stresses cause present or future microscopic fissures in the body and surfaces of the finished thermoset products. These latent stresses and microscopic fissures and crazes cause a problem when the cast products are used as kitchen sinks, vanity tops, countertops and the like, wherein the surfaces are exposed to mild caustic and acidic cleaning chemicals, in the form of surface cleaning compounds, detergents, bleaches and polishes.

Another problem, particularly prevalent with kitchen sinks, and the like, is that the thermoset material is subjected to sudden thermal shock (sudden contraction or expansion) caused by exposure to hot or cold water. The microfissures become aggravated under such treatment, and eventually enlarge to the point that visible cracks occur. Eventually, the fixture must be replaced.

The American National Standard for Plastic Laboratories (ANSI) has a number of standard tests which must be passed in order for a particular lavatory product to be commercially acceptable. One test, ANSI Z124.3, Section 6.3, requires, among other things, that the lavatory unit be subjected to thermal shock exposure by having the product endure at least 500 cycles of hot and cold water. Each cycle consists of 1.5 minutes of 150° F. water flowing at a rate of 1 gal./minute, followed by a 30 second drain. The product is then exposed to 1.5 minutes of 50° F. water flowing at 1 gal./minute. No crazing, cracking, blistering or spalling must be visible in the product at the conclusion of 500 cycles.

German Patent No. 29 22 675, Karl Schock, issued Jan. 29, 1981, discloses a process of making articles of mineral filled acrylic resin. The articles include kitchen sinks, vanity tops and a variety of similar products. In the Schock process, it is mentioned that the material is poured into a closed mold. During the polymerization process, the polymer shrinks. To accommodate this, a force is applied to one component of the mold to compensate for the shrinkage of the polymer material as it cures. The material is polymerized to completion in the mold, after which the mold is opened and the finished cured product is removed.

German Patent No. 371295 A1 describes a process whereby a first layer of polymer material is poured into a mold as first coating. At a later stage, the same or another polymer material is poured into the mold as reinforcement.

U.S. Pat. No. 4,652,596, Williams et al., granted Mar. 24, 1987, discloses a process for producing cast unsaturated thermosetting resins which are purportedly highly stain resistant. A pressurization step is applied to the thermosetting resin prior to casting to reincorporate any monomer which has volatilized during a previous vacuum deaeration step. The resultant casting is non-porous in cross-section which produces a product which is both stain resistant and machinable in the field without exposing voids.

U.S. Pat. No. 4,473,673, granted Sep. 25, 1984, Williams et al., describes a method in which basic resins are mixed with mineral filler in a vacuum process to densify the mixture before it is poured into a mold. The mold is then vibrated to accommodate the material and avoid air entrapments.

SUMMARY OF THE INVENTION

The subject invention relates to cured thermosetting products, either unfilled or filled with filler such as fibreglass or mineral fillers. The products are highly resistant to chemical attack and have high thermoshock resistance. The thermoshock resistant materials are used for the manufacture of kitchen sinks, vanity tops, bowls, countertops and furniture parts. The products are virtually stress free and are therefore highly resistant to thermoshock exposure, or attack by mildly caustic or acidic cleaning compounds, and the like.

The invention is directed to a process and apparatus of producing a non-porous cast thermosetting acrylic polymeric material, either homogenous or filled with fibreglass or mineral reinforcement, or combinations thereof, to produce cast products which have little or no latent stress in the finished molded article.

The invention is directed to a process for forming a thermosetting product which comprises: (a) pouring a thermosetting monomer, with or without filler, with initiator, and catalyst, into a cavity of a mold which has a polymer coating or film on the interior surface thereof; (b) permitting the polymer material to cure to a point where the cured material is reasonably dimensionally stable; (c) removing the partially cured polymeric material from the mold and placing the material in an oven; and (d) fully curing the polymeric material in the oven.

The monomer can be an acrylic monomer selected from the group consisting of methylmethacrylate, n-butymethacrylate, n-hexylmethacrylate, n-butylacrylate, 2-ethylhexylacrylate, 2-ethylhexylmethacrylate, ethyleneglycoldimethacrylate, triethyleneglycoldimethacrylate and trimethylolpropane.

The polymerization initiator can be selected from the group consisting of a zinc, cadmium, cobalt, copper or an iron substituted organic substance or from the group consisting of zinc thioglycol, cadmium thioglycol, cobalt naphthenate, iron naphthenate and copper naphthenate.

The catalyst can be selected from the group consisting of lauryl peroxide, benzoyl peroxide, hydroperoxide, alkylperoxide, dibenzoyl peroxide, dilauryl peroxide, t-butyl peroctoate, perbenzoate, perpivalate, permaleinate azobis-isobutylacetate, azobis-isobutyl nitrile, butyl permaleinate peroxide, t-butyl hydroperoxide modified with maleic anhydride, alkyd sulfhydride ester, methyleneglycolthioester, methylethyleneglycolthioacid ester and butyleneglycolthioacid ester.

The monomer can be methylmethacrylate. The catalyst can be a methyleneglycolthioacid ester. The monomer can be a mixture of methylmethacrylate and n-hexylmethacrylate. The catalyst can be lauryl peroxide and benzoyl peroxide.

The polymer film can be selected from the group consisting of polyethylene film, polyvinylchloride film, polyvinyl acetate film, or polyvinyl alcohol film. The polymer coating can be a sprayed polyvinyl alcohol.

The polymerization of the polymer material can be taken to about 92 to 94% completion in the mold, the mold can be opened, and the partially cured material can be cured in an oven at a temperature of about 100° C. to 100% completion. The mold can be constructed of a material selected from the group consisting of polyester resin, epoxy resin, steel and aluminum.

The invention is also directed to a mold for forming a polymerized product comprising: (a) a female component which has formed therein one portion of a mold cavity; (b) a male component which has formed therein a complementary portion of a mold cavity, the male component being adapted to engage the female component so that a complete mold cavity is formed between the two components; and (c) a flexible polymeric film or coating covering the interior surface of the mold cavity when the male and female mold components are engaged.

The interior surface of the mold cavity can be coated with a removable polymeric coating. The female and male components of the mold can be formed of polished aluminum, and the polymeric film material can be formed of a polymer selected from the group consisting of polyethylene film, polyvinyl chloride film, polyvinyl-polyvinylidene film and polyvinyl alcohol film.

BRIEF DESCRIPTION OF THE DRAWINGS

In drawings which illustrate specific embodiments of the invention but which should not be construed as restricting the spirit or scope of the invention in any way.

DETAILED DESCRIPTION OF THE INVENTION

Figure 1:
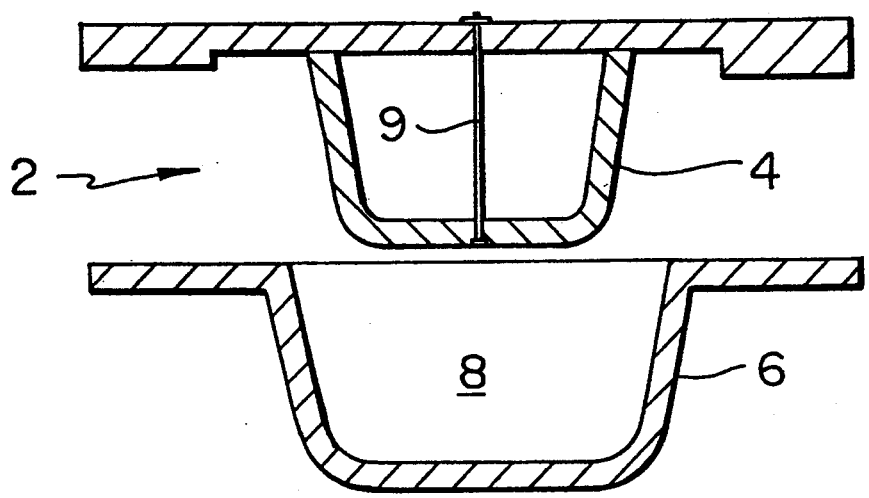
FIG. 1 represents a schematic end section view of a two-part mold forming a mold cavity.

The process and apparatus of the invention produces a non-porous thermosetting polymeric cast article, either homogenous unfilled, or filled with reinforcing material such as fibreglass, or mineral fillers, or combinations thereof, which is virtually free of latent stresses which are prone to attack by mildly alkaline or acidic cleaning materials or crazing or microfissure development due to thermoshock caused by hot or cold temperatures. Suitable casting materials can be therosetting polyesters, epoxys or acrylics. As a general rule, for lavatory or kitchen fixtures, polyacrylics are preferred because they generally possess superior properties. Suitable acrylic monomers are methylmethacrylate and butylmethacrylate or ethylmethacrylate, n-butymethacrylate, dimethacrylate, or a mixture of methacrylates.

A catalyst is used to initiate either a cold starting process or a hot process. The objective is to produce a 92% or 94% polymerized acrylic product in a closed mold without applying any pressure to the mold or the polymerized product. A polymer film lining in the mold cavity is used. The lining contacts the exterior surfaces of the acrylic polymer product, and shrinks about 2 to 5% with the polymer product as it cures to 92 to 94% cure. At that stage, the mold is opened, the semi-polymerized acrylic product is removed to an oven at 150° C., where it is polymerized to 100%.

It has been discovered that if initial cure is conducted without pressure to about 92 or 94% completion and the final 6 or 7% cure is conducted in an oven, internal latent stresses that are developed during the shrinkage are permitted to dissipate, thereby giving a finished product which is virtually free of latent stresses, which are the source of microscopic fissures and crazes in the cured product. It has been discovered that most of the 2 to 5% shrinkage occurs during the final 6 to 8% cure of the polymer material. The result of this process is that the finished product is not prone to developing hairline cracks, crazes or enlarged fissures which are commonplace with most polymer materials when the surface of the finished product is treated with mildly alkaline or caustic cleaning materials, soaps, detergents, bleaches, polishes, or exposure to thermoshock caused by cyclic exposure to hot and cold water.

The mold can be constructed of polyester resin, epoxy resin, stainless steel, nickel coated steel, or aluminum. Aluminum is preferred because it is relatively inexpensive. The cavity is highly polished to minimize surface inconsistencies.

The mold comprises a female and a male component, which cooperate and close to provide a cavity. The mold cavity is first covered with a flexible polymeric film or sheet. The flexible film can be either sprayed on or layered into the mold. Suitable films or layering materials are polyethylene film, polyvinylchloride film, polyvinyl-polyvinylidene film, polyacrylic film or polyvinyl alcohol film. Once the mold cavity is covered with the desired film, the mold is closed. The uncured acrylic polymer material, which can either be homogenous or include reinforcing material, such as fibreglass, or mineral filler, or combinations thereof, together with appropriate peroxide activators and catalysts, is poured into the mold cavity.

The polymeric material is allowed to cure to about 92 or 94% in the mold. This generally takes about 45 minutes. Then, the mold is opened and the 92 or 94% partially cured molded polymer material is removed with the protective film around the exterior surface of the product. Allowing the curing polymer to do most of its shrinking in a pressure free environment during the final stages of its cure avoids the development and build-up of internal stresses.

The partially cured product is then placed in an oven at a temperature of about 100° C. for approximately 30 minutes. This permits the polymeric material to fully cure to 100%. During this latter stage, latent stresses which are caused by the shrinkage of the polymeric material as it is cured, tend to be relieved and dissipate, thereby minimizing the creation of microscopic fissures and crazes in the fully cured material.

After being fully cured in the oven, the cured material is removed from the oven, all protruding edges are trimmed, and the product is cooled to room temperature. It is then ready for packaging for shipment. It is noted that the fully cured product which has shrunk about 2 to 5% no longer can be fit over the male part of the mold.

FIG. 1 represents a schematic end section view of a two-part mold with a mold cavity. As can be seen in FIG. 1, the mold 2 comprises a male component 4 and a female component 6, which together create a cavity 8. The male and female components are held together by a bolt 9.

Figure 2:
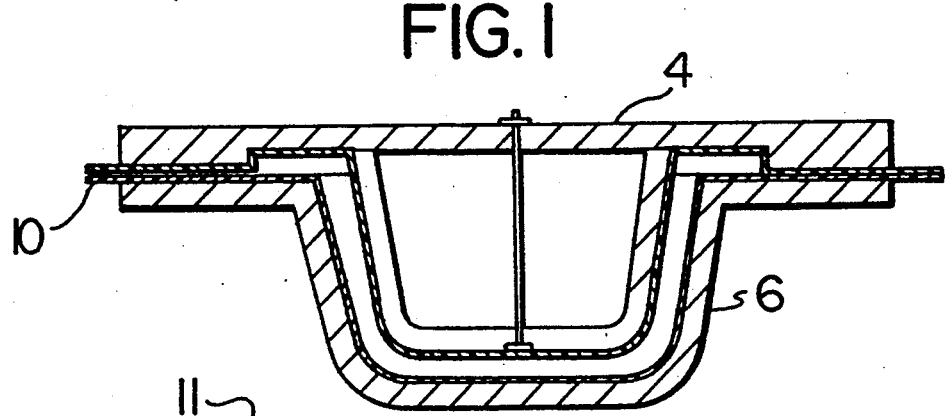
FIG. 2 represents a schematic end section view of a two-part mold with a polymeric film covering the walls of the interior cavity.

FIG. 2 represents a schematic end section view of the two-part mold with a polymeric film in the interior thereof. The interior surfaces of the cavity 8 are lined with a polymeric film, or are coated with a flexible polymeric coating 10.

Figure 3:
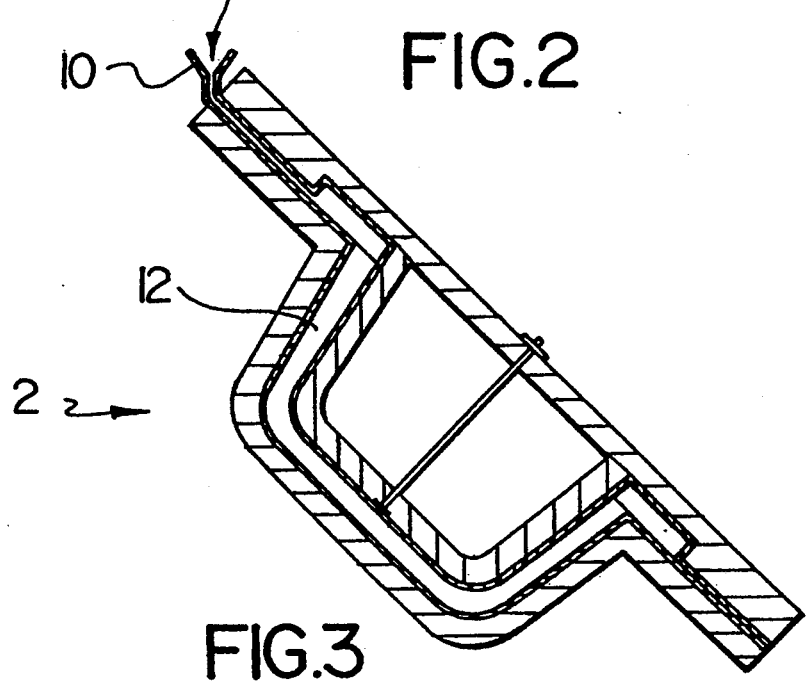
FIG. 3 illustrates a schematic end section view of a two part mold with the polymeric film covering the walls of the cavity therein, filled with poured polymeric material.

FIG. 3 illustrates a schematic end section view of the two-part mold 2 filled by the polymeric material 12 which is to be cast in the tipped mold. The liquid polymer is poured into the interior of the film or coating 10 through opening 11.

Figure 4:
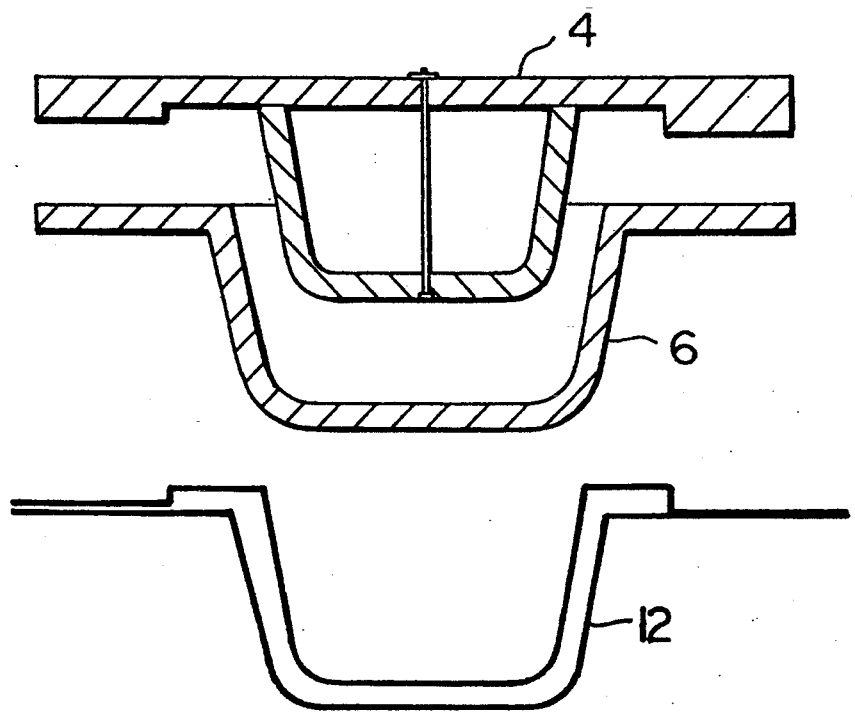
FIG. 4 illustrates a schematic end section view of the two part mold after being opened, with the 94% cured polymeric material being removed from the mold, prior to being placed in an oven.

FIG. 4 illustrates a schematic exploded end view of the two part mold 2 with the polymerized material 12, cured to about 94% completion, with the polymeric film or coating 10 shrunk around it, immediately after the mold is opened and the polymer 12 is removed from the mold 2, prior to being placed in the oven.

Figure 5:
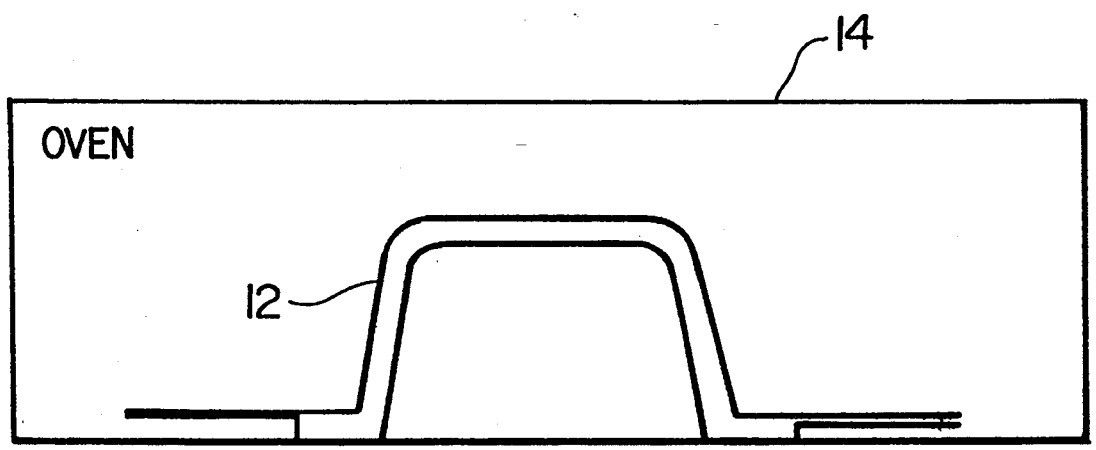
FIG. 5 illustrates a schematic end view of the 94% cured polymeric product being cured to full cure in an oven.

FIG. 5 illustrates a schematic end view of the 94% cured polymeric product 12 being cured in an oven 14 to completely cure the polymeric product 12.

EXAMPLE 1

The advantage of the thermoset acrylic product is that it is highly impact resistant, has low thermal conductivity (water stays warm in the container longer), is thermoshock resistant, and is not readily stained by tea bags, vegetable or fruit stains. The product has a non-porous hard surface and is ideally suited for construction of lavatory fixtures. Any scratches, cigarette burns, or stains which do form in the surface of the cast acrylic product can be readily removed with conventional household abrasive cleaners and a damp cloth.

100 grams of methylmethacrylate polymer, 5 grams of n-butyl methacrylate, 200 grams of aluminum trihydrate, 5 grams of silica powder, and 0.5% lauryl peroxide catalyst were poured into the polished cavity of an aluminum mold, which had been lined with poly alcohol film. The cavity of the mold was shaped to form a double sink. The polymeric material in the cavity of the mold was heated and permitted to cure for about 45 minutes to about 93% full cure. The mold was then opened and the partially cured polymeric material, with the film around the exterior surface, was sufficiently stable that it could be removed from the mold. The polymeric material was then placed in an oven with an internal temperature of about 120° C. for approximately 30 minutes. After removal from the oven, the cast material was allowed to cool. The result was a very attractive, smooth, polished surface, acrylic double sink. No crazes or fissures were visible in the surface of the molded double sink. Microscopic examination of the surface did not reveal any voids, latent bubbles or microscopic fissures or crazes.

EXAMPLE 2

A mixture of 100 grams methyl methacrylate, 220 grams aluminum trihydrate, 25 grams silica powder, 1% permaleinate peroxide and 0.5% zinc thioglycol was poured cold into the mold and reached about 93% of polymerization in about 45 minutes, at which time the mold was opened and the unit was placed in the oven at 120° C.

It was noted that the major shrinkage of the material occurred after the 93% curing stage. Once the finished product had been in the oven for final curing, the piece did not fit over the male part of the mold. The material had the chance to freely shrink so the natural stress forces of the polymerized object could dissipate.

EXAMPLE 3

A standard twin bowl kitchen sink with overflow protection, identified with the trade-mark BELLA, and a single sink vanity top identified with the trade-mark DELTA, both constructed of the methylmethacrylate cured polymer of Example 1, were tested for thermoshock and water resistance by Industrial Testing Laboratories Inc., St. Louis, Mo., according to American National Standard for Plastic Laboratories Test ANSI Z124.3.

Both polyacrylic units were subjected to thermal shock exposure. Each cycle consisted of 1.5 minutes of 150° F. water flowing at one gallon per minute, followed by a 30 second drain period, followed by 1.5 minutes of 50° F. water flowing at one gallon per minute. The water struck the bowl surface in the area near the drain where it would strike in a normal installation. No cracking, crazing, blistering or spalling was visible at the conclusion of 500 cycles.

Industrial Testing Laboratories Inc. performed 6,000 cycles on the kitchen sink, Model BELLA and vanity top, Model DELTA. The acrylic hot and cold water test was continued to more than 10,000 cycles on the vanity top, Model DELTA, with no evidence of failure in the polyacrylic material.

| | | |
|---|---|---|
| Test Specimen Identification: | Cerolan vanity top, Model Delta, manufactured by Polycryl Enterprises | |
| Test Method: | ANSI Z124.3-1986: American National Standard for Plastic Lavatories | |
| Test Results: | | |
| Section, ANSI Z124.3 1986 | Test Description/Results | Comments |
| 2.1 - Materials | Plastics of suitable grade | In Compliance |
| | Fillers of suitable grade | In Compliance |
| | Finish: Type Five, cast filled | In Compliance |

-continued

| | | |
|---|---|---|
| | polyester | |
| | Adequate support structure | In Compliance |
| 2.3 - Units for Testing | Taken from finished goods inventory | In Compliance |
| 2.6 - Identification | Manufacturer's name permanently marked on unit | In Compliance |
| 3.3 - Surface Test | Surface rubbed with ink solution in order to detect cracks chips or blisters. No such irregularities were found. | |
| | Performance Requirement: No cracks, chip or blisters. | In Compliance |
| 3.4 - Subsurface Test | Suspected areas sanded with 600 grit sandpaper and then rubbed with standard dirt, cleaned and inspected. No subsurface porosity was observed. | |
| | Performance Requirement: No visible voids larger than 1/16"; no more than four, smaller voids in the test area. | Pass |
| 4.2 - Drain Fitting Connection and Overflow | A 25 lb. weight was applied to the drain fitting by means of a 24" lever arm. The load was left in place for one minute in each of three radial positions, two of which were 180 degrees apart. At the conclusion of this test, no cracks were found. The test was repeated while the lavatory was full of water. No leaks were found. | |
| | Performance Requirement: No visible cracks, no leaks. | Pass |
| 4.3 - Point Impact Loads | A 1½", ¼ lb. steel ball was dropped from a height of 20" on three different locations on the top of the lavatory and three different locations in the bowl area. After inking the impact areas, no cracks or chips were found. | |
| | Performance Requirement: No cracks or chips. | Pass |
| 5.1 - Colorfastness | A specimen was removed from the lavatory and exposed for 200 hours in a Xenon-Arc weatherometer in accordance with ASTM D-2565-79. At the conclusion of the exposure period, the test specimen showed no significant change in color or surface texture when compared to an unexposed control specimen. | |
| | Performance Requirement: No significant change in color or surface texture. | Pass |
| 5.2 - Stain Resistance Test | A specific cut from the unit was conditioned by rubbing it for 20 scrub cycles with a wet scouring compound. Two drops of the following reagents were left on the unit for 16 hours: Black Crayon    Black Liquid Shoe Polish Hair Dye          Blue Washable Ink Lipstick            Iodine Solution Gentian Violet Solution After removal of the stains, the unit received a stain rating of 29. | |
| | Performance Requirement: Maximum Stain Rating of 50. | Pass |
| 5.3 - Wear and Cleanability Test | Three test specimens were removed from the unit. The specimens were scrubbed in a modified heavy duty wear tester. A hog-bristle brush and an abrasive slurry were used in the test. The samples were scrubbed for 10,000 cycles, after which they were cleaned, dried and measured for white-light reflectance. The samples were then rubbed with standard dirt, dried for one hour and cleaned with liquid detergent for 50 scrub cycles. The sample was then scrubbed for 50 cycles using a soft bristle brush and the abrasive slurry. The white-light reflectance was measured and a loss of 0% was determined. | |
| | Performance Requirement: Maximum absolute loss of white-light reflectance of 2% after abrasive cleaning. | Pass |
| 5.4 - Cigarette Test | Three different types of cigarettes were ignited and set on three specimens cut from the unit. The cigarettes were removed after two minutes. The specimens did not ignite or glow during or after contact with the | |

| | | |
|---|---|---|
| | cigarettes. Slight yellowing in the contact areas was removed with 400 grit sandpaper. The areas were polished in order to restore the original finish. | |
| | Performance Requirement: No ignition or progressive glow of the surface; no damage great enough to impair the service-ability of the unit; all damage must be repairable to approximate the original finish. | Pass |
| 5.5 - Chemical Resistance Test | Two drops of the following reagents were applied to the surface of the unit: Naptha Ethyl Alcohol Amyl Acetate 10% Ammonia Solution 10% Citric Acid Solution 6% Urea Solution 3% Hydrogen Peroxide Solution Sodium Hypochlorite Solution 5% Phenol Solution Toluene Ethyl Acetate 1% Lye Solution Acetone The reagents were removed after 16 hours. The surface of the unit was unaffected by the reagents. | |
| | Performance Requirement: Surface unaffected by the reagents except for superficial changes which are easily removable. No damage which will impair the serviceability of the unit. | Pass |
| 6.3 - Water Resistance | The unit was subjected to thermal shock exposure. Each cycle consisted of 1.5 minutes of 150 degrees Farenheit water flowing at one gallon per minute, followed by a 30 second drain period, followed by 1.5 minutes of 50 degree water flowing at one gallon per minute. The water struck the bowl surface in the area near the drain where it would strike in a normal installation. The unit was subjected to 10,000 cycles of thermal shock exposure with no evidence of failure in the Cerolan material. | |
| | Performance Requirements: No cracking, crazing, blistering or spalling is permissible at the conclusion of 500 cycles. | Pass |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for forming a thermosetting polymeric product of a desired configuration, which process comprises:
   (a) providing a first mold with a first cavity therein which conforms in shape with at least a portion of the configuration of the product;
   (b) providing a second mold with a second cavity therein which conforms in shape with the remaining portion of the configuration of the product not covered by the first cavity;
   (c) applying a removable polymer coating or film to the respective surfaces of the first cavity and the second cavity;
   (d) combining the first mold and the second mold so that the first cavity and the second cavity form a whole cavity which conforms with the desired configuration of the product;
   (e) pouring a monomeric material which upon full cure yields a thermosetting polymer, with initiator, and catalyst, into the cavity formed by the first and second molds;
   (f) permitting the monomeric material to polymerize and partially cure to a point where the partially cured polymeric material is reasonably dimensionally stable, the polymeric material shrinking in volume during partial cure and the polymer coating or film remaining adhered to the external surface of the shrinking monomeric material and preventing air from contacting the surface of the partially cured monomeric material;
   (g) removing the partially cured polymeric material and the covering polymeric coating or film from the mold cavity and placing the material in an oven; and
   (h) fully curing the polymeric material in the oven.

2. A process as defined in claim 1 wherein the monomer is an acrylic monomer selected from the group consisting of methylmethacrylate, n-butymethacrylate, n-hexylmethacrylate, n-butylacrylate, 2-ethylhexylacrylate, 2-ethylhexylmethacrylate, ethyleneglycol-dimethacrylate, triethyleneglycol-dimethacrylate and trimethylolpropanate.

3. A process as defined in claim 1 wherein the polymerization initiator is selected from the group consisting of a zinc, cadmium, cobalt, copper or an iron substituted organic substance.

4. A process as defined in claim 2 wherein the polymerization initiator is selected from the group consisting of zinc thioglycol, cadmium thioglycol, cobalt naphthenate, iron naphthenate and copper naphthenate.

5. A process as defined in claim 1 wherein the catalyst is selected from the group consisting of lauryl peroxide, benzoyl peroxide, hydroperoxide, alkylperoxide, dibenzoyl peroxide, dilauryl peroxide, t-butyl peroctoate, perbenzoate, perpivalate, permaleinate azobis-isobutyl acetate, azobis-isobutyl nitrile, butyl permalienate peroxide, t-butyl hydroperoxide modified with maleic anhydride, alkyd sulfhydride ester, methyleneglycolthioester, methylethyleneglycolthioacidester and butyleneglycolthioacid ester.

6. A process as defined in claim 2 wherein the catalyst is selected from the group consisting of lauryl peroxide, benzoyl peroxide, hydroperoxide, alkylperoxide, dibenzoyl peroxide, dilauryl peroxide, t-butyl peroctoate, perbenzoate, perpivalate, permaleinate azobis-isobutyl acetate, azobis-isobutyl nitrile, butyl permalienate peroxide, t-butyl hydroperoxide modified with maleic anhydride, alkyd sulfhydride ester, methyleneglycolthioester, methylethyleneglycolthioacidester and butyleneglycolthioacid ester.

7. A process as defined in claim 3 wherein the catalyst is selected from the group consisting of lauryl peroxide, benzoyl peroxide, hydroperoxide, alkylperoxide, dibenzoyl peroxide, dilauryl peroxide, t-butyl peroctoate, perbenzoate, perpivalate, permaleinate azobis-isobutyl acetate, azobis-isobutyl nitrile, butyl permalienate peroxide, t-butyl hydroperoxide modified with maleic anhydride, alkyd sulfhydride ester, methyleneglycolthioester, methylethyleneglycolthioacidester and butyleneglycolthioacid ester.

8. A process as defined in claim 1 wherein the monomer is methylmethacrylate.

9. A process as defined in claim 1 wherein the polymer is a mixture of methylmethacrylate and n-butylmethacrylate.

10. A process as defined in claim 8 wherein the catalyst is a methyleneglycolthioacid ester.

11. A process as defined in claim 1 wherein the monomer is a mixture of methylmethacrylate and n-hexylmethacrylate.

12. A process as defined in claim 11 wherein the catalyst is lauryl peroxy and benoyl peroxide.

13. A process as defined in claim 1 wherein the polymer film is selected from the group consisting of polyethylene, polyvinylchloride, polyvinyl acetate film and polyvinyl alcohol film.

14. A process as defined in claim 1 wherein the polymer coating is a sprayed polyvinyl alcohol.

15. A process as defined in claim 1 wherein the polymerization of the polymer material is taken to about 92 to 94% completion in the mold, the mold is opened, and the partially cured material is cured in an oven at a temperature of about 120° C. to 100% completion.

16. A process as defined in claim 1 wherein the mold is constructed of a material selected from the group consisting of polyester resin, epoxy resin, steel and aluminum.

* * * * *